(12) United States Patent
Kim

(10) Patent No.: US 11,402,018 B2
(45) Date of Patent: Aug. 2, 2022

(54) ALTERNATOR DRIVING APPARATUS FOR DRIVING AN ALTERNATOR

(71) Applicants: Hyundai Motor Company, Seoul (KR); Kia Motors Corporation, Seoul (KR)

(72) Inventor: Jong Hyuck Kim, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 382 days.

(21) Appl. No.: 16/800,140

(22) Filed: Feb. 25, 2020

(65) Prior Publication Data

US 2020/0191264 A1 Jun. 18, 2020

Related U.S. Application Data

(62) Division of application No. 15/795,715, filed on Oct. 27, 2017, now Pat. No. 10,612,654.

(30) Foreign Application Priority Data

Jun. 7, 2017 (KR) .................. 10-2017-0070584

(51) Int. Cl.
*F16H 3/24* (2006.01)
*F16H 61/682* (2006.01)
*F16H 3/04* (2006.01)
*F16H 9/26* (2006.01)
*F16H 59/00* (2006.01)
(Continued)

(52) U.S. Cl.
CPC ............. *F16H 61/682* (2013.01); *F16H 3/04* (2013.01); *F16H 3/24* (2013.01); *F16H 9/26* (2013.01); *F16H 59/00* (2013.01); *F16H 59/36* (2013.01); *F16H 59/64* (2013.01); *B60R 16/033* (2013.01); *F02N 11/003* (2013.01); *F16H 2059/366* (2013.01)

(58) Field of Classification Search
CPC .......... F16H 61/682; F16H 3/24; F16H 59/64; F16H 2059/366; F02B 67/06; B60K 2025/022; B60K 2025/024; B60W 10/03; B60W 10/10; B60W 2510/242; B60W 2510/0638; B60W 2550/00; B60W 2550/20; B60W 2710/10; B60W 2710/1005
USPC ....................................................... 180/53.8
See application file for complete search history.

(56) References Cited

U.S. PATENT DOCUMENTS

| 4,862,770 A | 9/1989 | Smith |
| 5,266,836 A | 11/1993 | Sousa |

(Continued)

FOREIGN PATENT DOCUMENTS

| JP | 2006-266195 A | 10/2006 |
| JP | 2016200137 A | * 12/2016 |

(Continued)

*Primary Examiner* — Roger L Pang
(74) *Attorney, Agent, or Firm* — Morgan, Lewis & Bockius LLP

(57) ABSTRACT

An alternator driving apparatus for driving an alternator may include a crank pulley mounted on a crank shaft of an engine, an alternator pulley connected to the crank pulley through a driving belt, an alternator shaft connected between the alternator and the alternator pulley, and a rotation speed varying mechanism configured to vary a rotation speed of the alternator shaft.

2 Claims, 8 Drawing Sheets

(51) Int. Cl.
  *F16H 59/36*  (2006.01)
  *F16H 59/64*  (2006.01)
  *B60R 16/033* (2006.01)
  *F02N 11/00*  (2006.01)

(56) References Cited

U.S. PATENT DOCUMENTS

| | | | |
|---|---|---|---|
| 6,048,288 A * | 4/2000 | Tsujii | B60W 10/30 |
| | | | 903/910 |
| 6,878,094 B2 * | 4/2005 | Kitamura | F02N 15/046 |
| | | | 475/5 |
| 8,292,768 B2 * | 10/2012 | Noboru | F02N 15/08 |
| | | | 475/5 |
| 2007/0102932 A1 | 5/2007 | Ihata et al. | |
| 2012/0025542 A1 | 2/2012 | Schaaf | |
| 2016/0185335 A1 | 6/2016 | Namuduri | |
| 2017/0089426 A1 | 3/2017 | O'Brien | |
| 2017/0174048 A1 * | 6/2017 | Eisenhour | B60K 17/28 |

FOREIGN PATENT DOCUMENTS

| | | |
|---|---|---|
| KR | 10-1703591 B | 2/2017 |
| KR | 10-1703593 B | 2/2017 |

\* cited by examiner

ALTERNATOR DRIVING APPARATUS FOR DRIVING AN ALTERNATOR

CROSS-REFERENCE(S) TO RELATED APPLICATIONS

The present application is a Divisional of U.S. patent application Ser. No. 15/795,715, filed Oct. 27, 2017, which claims priority to Korean Patent Application No. 10-2017-0070584, filed Jun. 7, 2017, the entire contents of which are incorporated herein for all purposes by these references.

BACKGROUND OF THE INVENTION

Field of the Invention

The present invention relates to an alternator, and more particularly to an alternator driving apparatus that may improve an output current and a generation efficiency of an alternator by varying the speed of the alternator according to a change in the speed of an engine and a charging state of a battery.

Description of Related Art

In general, a vehicle alternator is driven by an engine including an internal combustion engine mounted on a vehicle through a driving belt that joins the vehicle alternator and the engine. Such a vehicle alternator is driven by the rotation force provided from the engine through the driving belt to generate an electric power.

A speed increasing ratio of the vehicle alternator is determined based on a ratio between a groove diameter of a crankshaft pulley and a groove diameter of a pulley of the vehicle alternator. Meanwhile, the output current and efficiency of the alternator may vary according to the speed of the engine. At low speeds, the alternator output is insufficient to provide the power needed to operate all electrical equipment of the vehicle while at a high speeds, power generation is sufficient to far exceed these requirements.

Meanwhile, an idling condition or a low speed section of the engine may occupy about 40 to 60% of the whole driving time of the vehicle, and because a load of the vehicle is constantly consumed due to the idling condition or the low speed section of the engine, the durability of the battery may decrease. For example, because special vehicles may constantly consume an electrical load in an idling portion and buses may consistently consume the load of the vehicle due to frequent stops, the charging level of the battery cannot be stably maintained and the durability of the battery may decrease.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing an alternator driving apparatus that may improve an output current and a generation efficiency of an alternator by varying the speed of the alternator according to a change of the speed (RPM) of an engine or a charging condition of a battery.

The technical objects of the present invention are not limited to the above-mentioned one, and the other unmentioned technical objects will become apparent to those skilled in the art from the following description.

In accordance with an aspect of the present invention, there is provided an alternator driving apparatus for driving an alternator, the alternator driving apparatus including a crank pulley mounted on a crank shaft of an engine, an alternator pulley connected to the crank pulley through a driving belt, an alternator shaft connected between the alternator and the alternator pulley, and a rotation speed varying mechanism configured to vary a rotation speed of the alternator shaft.

The rotation speed varying mechanism may be configured to selectively change the rotation speed of the alternator shaft through one or more speed increasing ratios according to a rotation speed of the engine.

The rotation speed varying mechanism may be configured to increase the rotation speed of the alternator shaft at a low speed.

The rotation speed varying mechanism may include a rotary body provided in the alternator pulley as a single body and having one or more engagements formed in the internal thereof, one or more gear portions formed in the alternator shaft, and an actuator configured to move at least a portion of the alternator shaft, and the one or more gear portions may be selectively engaged with the one or more engagements as the at least a portion of the alternator shaft moves.

The alternator shaft may have a first gear portion and a second gear portion that are distanced from each other, and the rotary body may have a first engagement and a second engagement that are distanced from each other, and the first gear portion and the second gear portion may be selectively engaged with the first engagement and the second engagement as the at least a portion of the alternator shaft moves.

The first engagement may have an internal diameter corresponding to an external diameter of the first gear portion.

A plurality of teeth may be formed on an external periphery of the first gear portion and a plurality of teeth meshed with the teeth of the first gear portion may be formed on an internal periphery of the first engagement.

The second engagement may include an annulus formed on an internal surface of the rotary body and having a plurality of internal teeth, and a plurality of internal gears meshed with the internal teeth of the annulus, and the second gear portion may be selectively meshable with the plurality of internal gears through movement of the alternator shaft.

Each of the internal gears may have a small diameter gear portion and a large diameter gear portion, the small diameter gear portion may have an external diameter which is smaller than that of the large diameter gear portion, the small diameter gear portion may be meshed with the internal teeth of the annulus, and the second gear portion may be selectively meshed with the large diameter gear portion.

An external diameter of the second gear portion may be smaller than an external diameter of the first gear portion.

The alternator shafts may include a first shaft connected to the rotary body, and a second shaft connected to the alternator, and the first shaft may be disposed to be moved by the actuator.

A connection state of the first shaft and the second shaft may be maintained when the first shaft moves.

The alternator shaft may be a single body, and the alternator shaft may be moved by the actuator.

One end portion of the alternator shaft may be mounted to be movable with respect to the rotary body, and an opposite end portion of the alternator shaft may be connected to a rotor of the alternator.

In accordance with another aspect of the present invention, there is provided a method for controlling the alternator driving apparatus, the method including monitoring an external temperature, a current of the battery, a speed of the engine, in any one of a condition in which an external temperature is not less than a predetermined temperature, a condition in which a current of the battery is not less than a predetermined current, and a condition in which the rotation speed of the engine is a high or middle speed, the alternator shaft is rotated at the same rotation speed as the rotation speed of the alternator pulley.

In any one of a condition in which an external temperature is not more than a predetermined temperature, a condition in which a current of the battery is not more than a predetermined current, and a condition in which the rotation speed of the engine is a low speed, the alternator shaft may be rotated at a rotation speed which is higher than the rotation speed of the alternator pulley.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
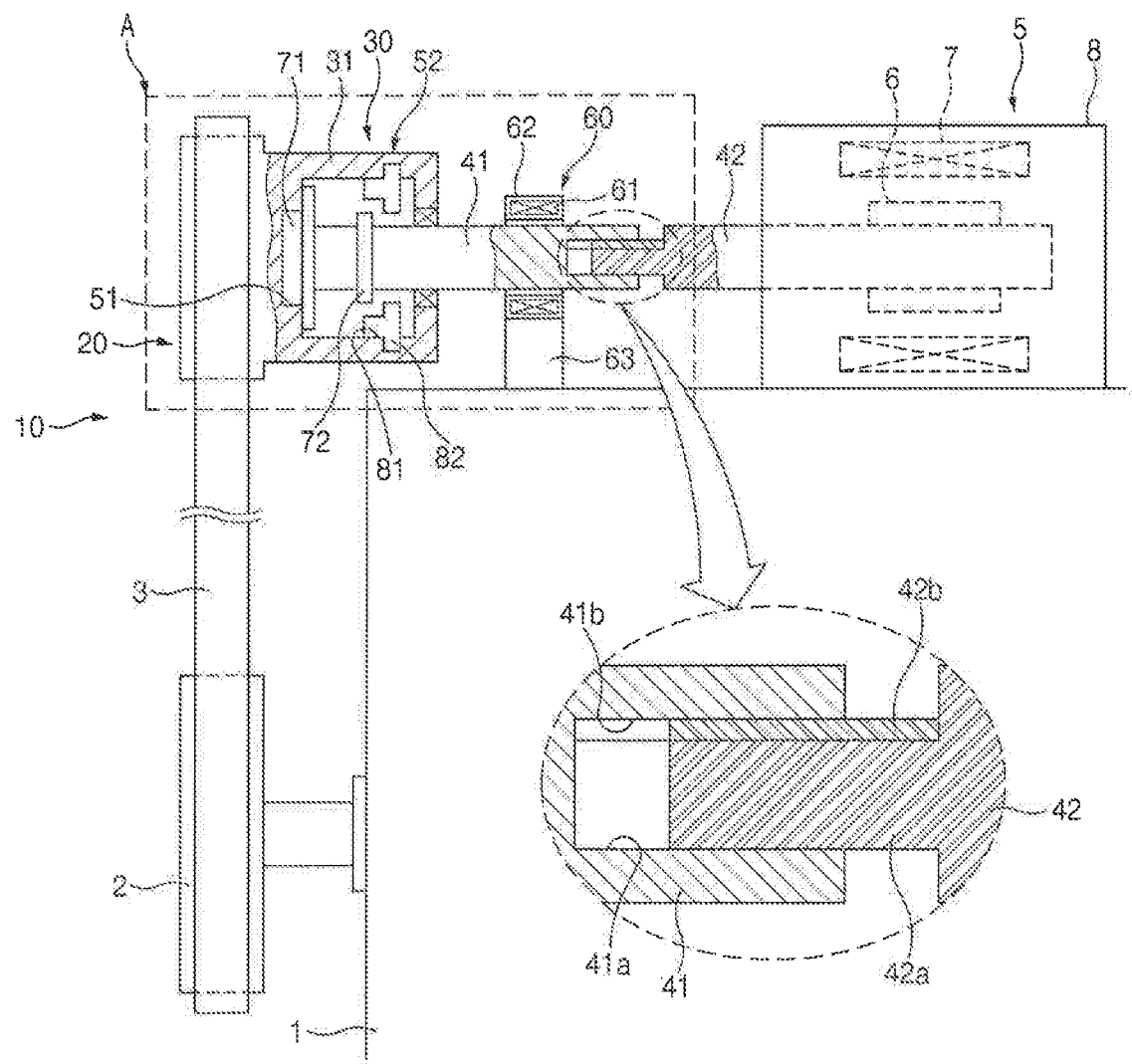
FIG. 1 is a schematic view illustrating an alternator driving apparatus according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings. Throughout the specification, it is noted that the same or like reference numerals denote the same of like components even though they are provided in different drawings. Furthermore, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present invention pertains. The terms defined in the generally used dictionaries should be construed as having the meanings that coincide with the meanings of the contexts of the related technologies, and should not be construed as ideal or excessively formal meanings unless clearly defined in the specification of the present invention.

Figure 2:
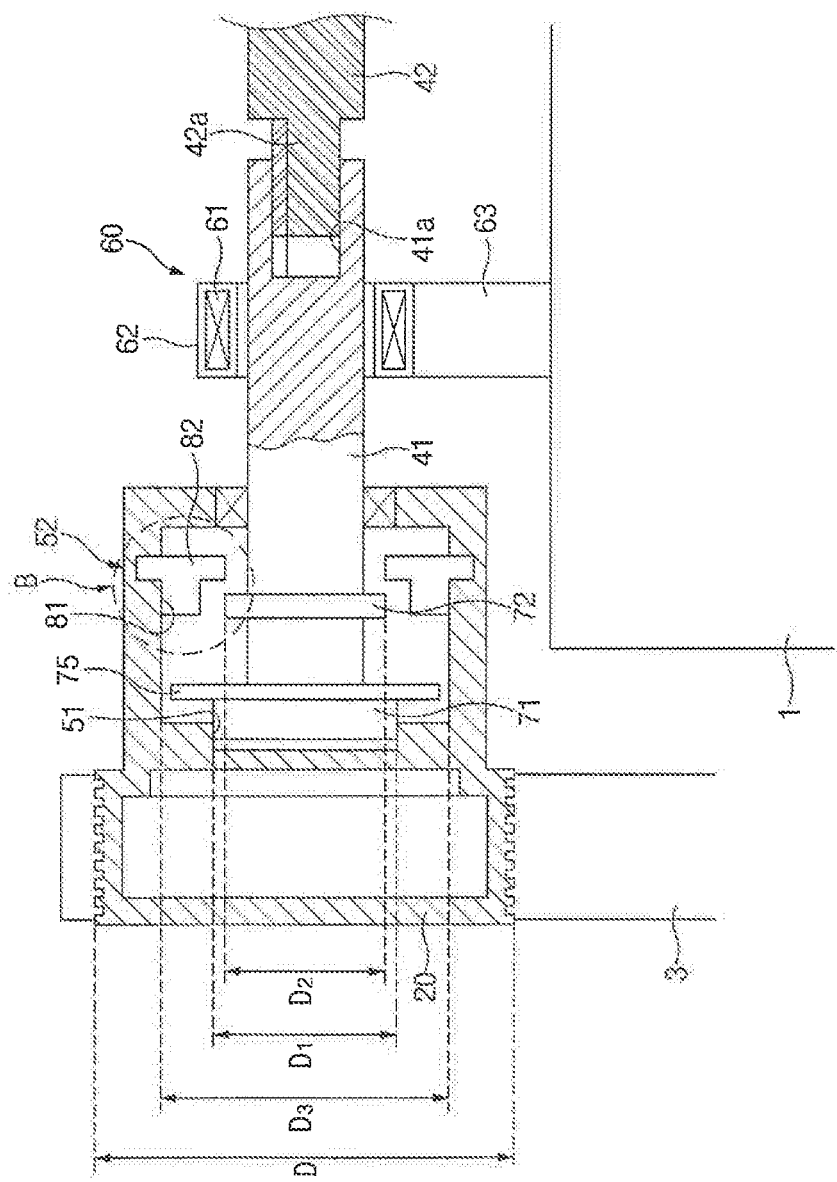
FIG. 2 is an enlarged view of a portion of arrow A of FIG. 1, and illustrates a state in which a first gear portion is engaged with a first engagement.
Figure 3:
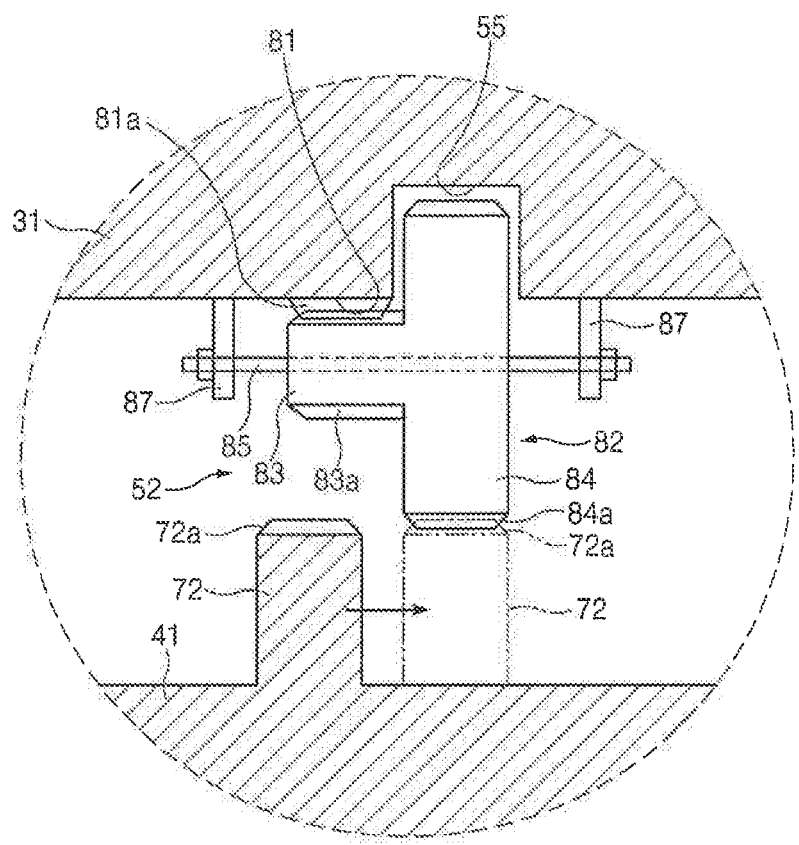
FIG. 3 is an enlarged view of a portion of arrow B of FIG. 1.

Referring to FIG. 1, FIG. 2, and FIG. 3, an alternator driving apparatus 10 according to an exemplary embodiment of the present invention may include a crank pulley 2 of an engine 1, an alternator pulley 20, and a driving belt 3 that frictionally engage the crank pulley 2 and the alternator pulley 20.

The crank pulley 2 may be mounted on a crank shaft of the engine 1, the alternator pulley 20 may be mounted on alternator shafts 41 and 42, and the alternator shafts 41 and 42 may be connected between the alternator pulley 20 and the alternator 5. The driving belt 3 may frictionally engage the crank pulley 2 and the alternator pulley 20, and the crank pulley 2 and the alternator pulley 20 may have a predetermined pulley ratio. Accordingly, a torque of the engine 1 may be transmitted to the alternator pulley 20 through the crank pulley 2 and the driving belt 3.

The alternator driving apparatus 10 according to the exemplary embodiment of the present invention may include a rotation speed varying mechanism 30 configured to vary rotation speeds of the alternator shafts 41 and 42 according to a change of the speed of the engine or a charging condition of a battery.

According to various aspects of the present invention, the rotation speed varying mechanism 30 may be configured to selectively vary rotation speeds of the alternator shafts 41 and 42 through at least one speed increasing ratio according to a change of the speed of the engine or a charging condition of the battery.

The rotation speed varying mechanism 30 may include a rotary body 31 provided on one side of the alternator pulley 20 as a single body, and through this, the rotary body 31 may rotate together with the alternator pulley 20.

According the embodiment of FIG. 1, FIG. 2, and FIG. 3, the rotary body 31 may have a cylindrical shape having a hollow, and the alternator shafts 41 and 42 may include a first shaft 41 mounted to be movable in the hollow of the rotary body 31, and a second shaft 42 connected to the alternator 5.

The first shaft 41 may be movably mounted on the rotary body 31 by an actuator 60. The first shaft 41 may move along an axial direction thereof.

According to various aspects of the present invention, the actuator 60 may be a solenoid actuator including a bobbin 62, on which a solenoid coil 61 is wound. The actuator 60 may be mounted on one side of the engine 1 to be supported, through a bracket 63. A bearing that rotatably rotate the first shaft 41 may be disposed on an internal surface of the bobbin 62.

According to an exemplary embodiment of the present invention, the actuator 60 may include actuators of various structures, in addition to the solenoid actuator.

A control device is connected to the actuator 60, and the control device may control the actuator 60 according to a rotation speed of the engine, a charging state of the battery, an external temperature condition, and the like.

Two or more gear portions 71 and 72 may be thrilled on the first shaft 41 as a single body, and each of the gear portions 71 and 72 may have a plurality of external teeth formed on an external periphery thereof. The external diameters D1 and D2 of the gear portions 71 and 72 may be smaller than the external diameter D of the alternator pulley 20.

According to various aspects of the present invention, a first gear portion 71 and a second gear portion 72 may be integrally or monolithically formed on the alternator shaft 40, the first gear portion 71 and the second gear portion 72 may be preferably unitary with the alternator shaft 40. The first gear portion 71 and the second gear portion 72 may be distanced from each other along an axial direction of the alternator shaft 40. The external diameter D2 of the second gear portion 72 may be smaller than the external diameter D1 of the first gear portion 71.

The second shaft 42 may be engaged with a rotor 6 of the alternator 5, and the alternator 5 may include a rotor 6, a stator 7, and a housing 8.

The first shaft 41 and the second shaft 42 may be connected to each other through a connection recess 41a and a connection projection 42a. The connection recess 41a and the connection projection 42a may be formed at a location at which the first shaft 41 and the second shaft 42 are connected to each other to correspond to each other.

Even though the first shaft 41 is moved, a state in which the first shaft 41 and the second shaft 42 are connected to each other may be maintained by the connection recess 41a and the connection projection 42a.

According to various aspects of the present invention, the first shaft 41 may have the connection recess 41a that extends in the axial direction of the first shaft 41, and the second shaft 42 may have the connection projection 42a protruding that extends in the axial direction of the second shaft 41g toward the first shaft 41. The connection projection 42a may be accommodated in the connection recess 41a to be movable. At least one key 42b may be formed on an external surface of the connection projection 42a, and a key way 41b, into which the key 42b is slidably inserted, may be formed in the connection recess 41a.

Because the key 42b and the key way 41b prevent the first shaft 41 and the second shaft 42 from being rotated with respect to each other, the first shaft 41 and the second shaft 42 may be rotated together in the same direction, and accordingly, the first shaft 41 and the second shaft 42 may continue to be connected to each other as a single body.

Furthermore, the alternator shafts 41 and 42 may vary as the first gear portion 71 and the second gear portion 72 of the first shaft 41 are selectively engaged with the rotary body 31.

One or more engagements 51 and 52 may be formed in the internal surface of the rotary body 31, and the gear portions 71 and 72 of the first shaft 41 may be selectively engaged with the one or more engagements 51 and 52.

According to various aspects of the present invention, the rotary body 31 may have a first engagement 51, with which the first gear portion 71 of the first shaft 41 is selectively engaged, and a second engagement 52, with which the second gear portion 72 of the first shaft 41 is selectively engaged.

The first engagement 51 and the second engagement 52 may be distanced from each other at an interval corresponding to the interval between the first gear portion 71 and the second gear portion 72. The first engagement 51 may be disposed close to the alternator pulley 20, and the second engagement 52 may be disposed far away from the alternator pulley 20.

The first engagement 51 has a plurality of internal teeth selectively meshable with the plurality of external teeth of the first gear portion 71, and may have an internal diameter corresponding to the external diameter D1 of the first gear portion 71. As the first shaft 41 moves, the external teeth of the first gear portion 71 may be selectively meshed with the internal teeth of the first engagement 51, and through this, the first gear portion 71 may be engaged with the first engagement 51 of the rotary body 31. As the first gear portion 71 is engaged with the first engagement 51, the torque of the alternator pulley 20 may be transmitted to the first shaft 41 while the speed ratio is 1:1, and the alternator shafts 41 and 42 may be rotated at the same rotation speed as that of the alternator pulley 20.

As illustrated in FIG. 2 and FIG. 3, the second engagement 52 may have an annulus 81 formed on an internal surface of the rotary body 31. The annulus 81 may have a plurality of internal teeth continuously formed on an internal surface of the rotary body 31 along a circumferential direction of the rotary body 31. A plurality of internal gears 82 may be meshed with the internal teeth 81a of the annulus 81, and the plurality of internal gears 82 may be disposed at a predetermined interval along the annulus 81. Each of the internal gears 82 may have a small diameter gear portion 83 and a large diameter gear portion 84. The small diameter gear portion 83 may have an external diameter which is smaller than that of the large diameter gear portion 84, and the large diameter gear portion 84 may be smaller than the internal diameter D3 of the rotary body 31. The small diameter gear portion 83 may have a plurality of external teeth 83a formed on an external surface thereof, and the external teeth 83a of the small gear portion 83 may be meshed with the internal teeth 81a of the annulus 81. The large diameter gear portion 84 may have a plurality of external teeth 84a formed on an external surface thereof, and as indicated by the dotted line of FIG. 3, the second gear portion 72 may be selectively engaged with the second engagement 52 as the external teeth 72a of the second gear portion 72 are selectively meshed with the external teeth 84a of the large diameter gear portion 84 due to the movement of the firs shaft 41.

The rotary body 31 may have an accommodation groove 55 annularly formed in the internal thereof, and parts of the large diameter gear portions 84 may be accommodated in the accommodation groove 55 of the rotary body 31.

Figure 4:
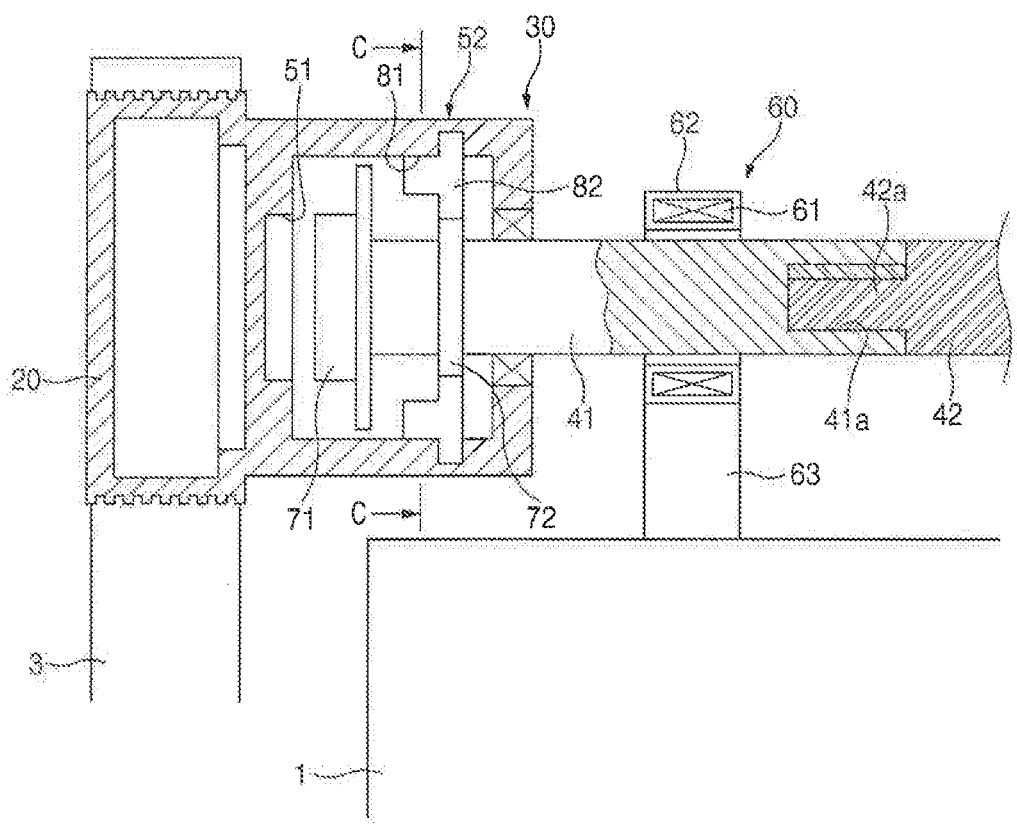
FIG. 4 illustrates a state in which a second gear portion is meshed with a large diameter gear portion of an internal gear.
Figure 5:
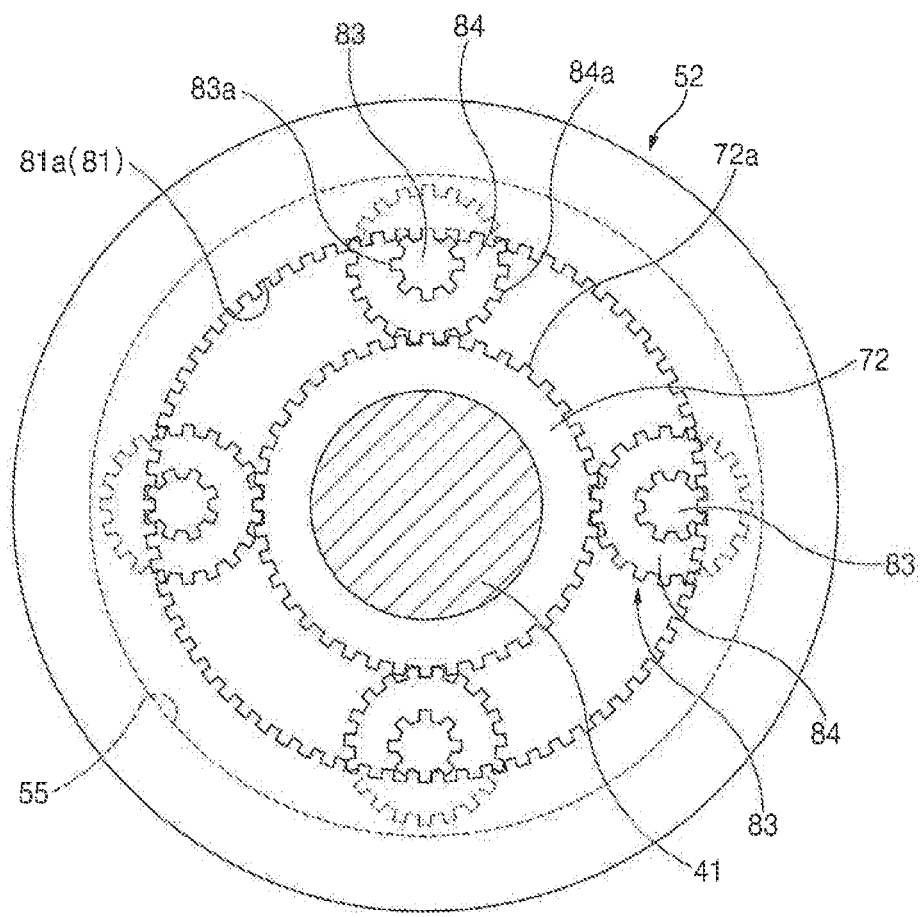
FIG. 5 is a sectional view taken along line C-C of FIG. 4.

As illustrated in FIG. 4, as the first shaft 41 moves toward the alternator 5, the torque of the alternator pulley 20 may be transmitted to the first shaft 41 when the second gear portion 72 is meshed with the large diameter gear portion 84 of the internal gear 82, and accordingly, the alternator shafts 41 and 42 be rotated while the speeds of the alternator shafts 41 and 42 are increased at a predetermined speed increasing ratio R. The above-described speed increasing ratio R may be determined according to the number of the internal teeth 81a of the annulus 81, the number of the external teeth 83a of the small diameter gear portion 83, the number of the external teeth 84a of the large diameter gear portion 84, and the number of the external teeth 72a of the second gear portion 72.

The external diameter D2 of the second gear portion 72 may be smaller than the external diameter D1 of the first gear portion 71, and accordingly, the speeds of the alternator shafts 41 and 42 may be increased through the speed increasing ratio R determined through the engagement of the second gear portion 72 and the second engagement 52.

In a high or middle speed section of the engine, a condition in which the temperature of the outside is a predetermined temperature or lower, and in a condition in which the current of the battery is a predetermined current or lower, as illustrated in FIG. 2, the first shaft 41 may be moved to the alternator pulley 20 by the actuator 60 and the first gear portion 71 of the first shaft 41 may be coupled to the first engagement 51 of the rotary body 31. Accordingly, the rotation speed of the first shaft 41 may be the same as the rotation speed of the alternator pulley 20.

In a lower speed section or an idling condition of the engine, a condition in which the temperature of the outside is a predetermined temperature or lower, and in a condition in which the current of the battery is a predetermined current or lower, as illustrated in FIG. 3, the first shaft 41 may be moved to the alternator 5 by the actuator 60 and the second gear portion 72 of the first shaft 41 may be coupled to the second engagement 52 of the rotary body 31. Accordingly, the rotation speeds of the alternator shafts 41 and 42 may be increased to a speed increasing ratio R determined by the second gear portion 72 and the second engagement 52.

Figure 6:
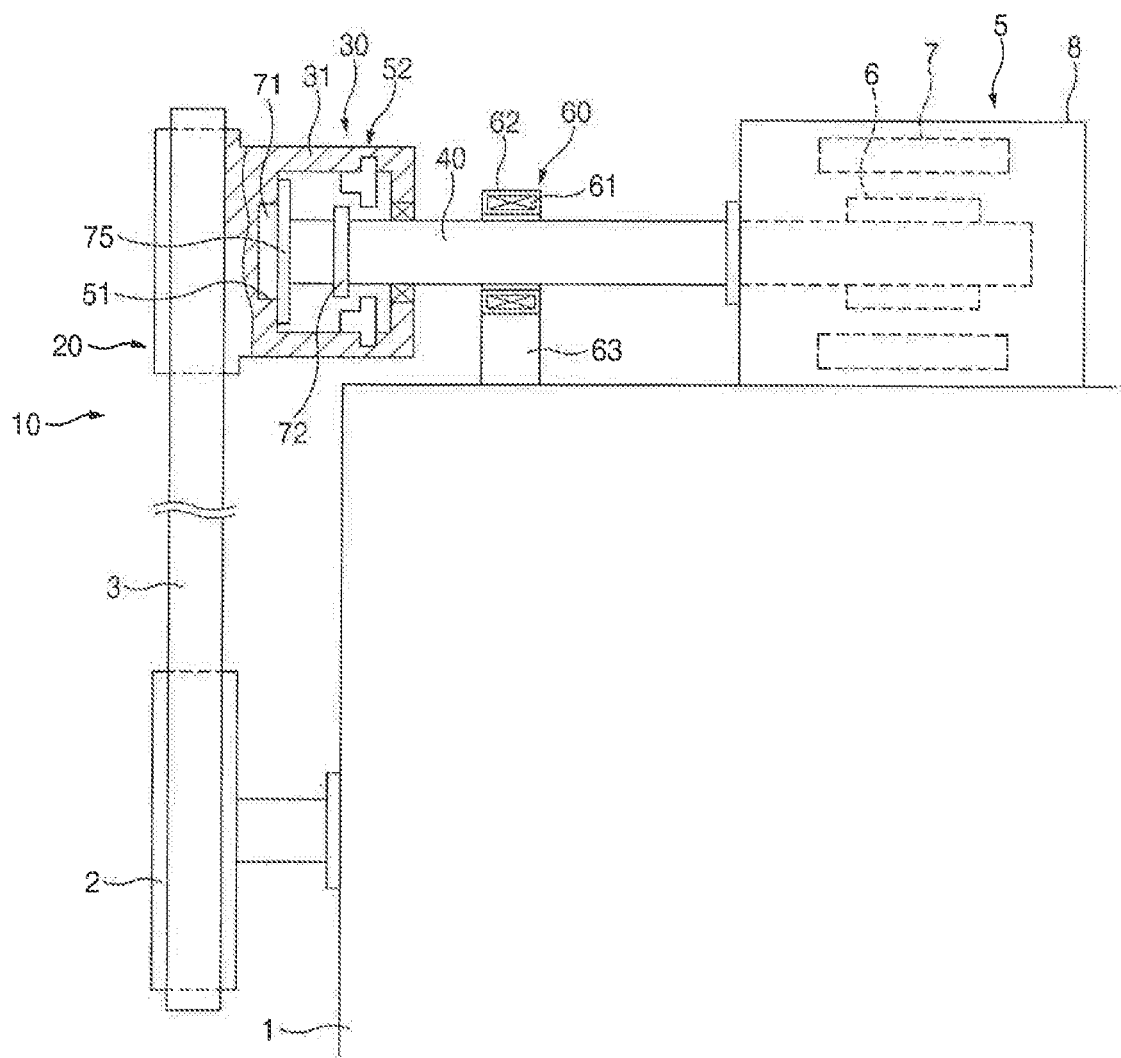
FIG. 6 is a schematic view illustrating an alternator driving apparatus according to another exemplary embodiment of the present invention.

FIG. 6 is a view illustrating an alternator driving apparatus 10 according to another exemplary embodiment of the present invention.

According to the embodiment of FIG. 6, the alternator shaft 40 may be a single body, and the alternator shaft 40 may be connected between the alternator pulley 20 and the alternator 5. One end portion of the alternator shaft 40 may be movably disposed in the rotary body 31, and the first gear portion 71 and the second gear portion 72 may be formed at one end portion of the alternator shaft 40 to be distanced from each other by a specific interval. The rotor 6 of the alternator 5 may be connected to an opposite end portion of the alternator shaft 40.

In the exemplary embodiment of FIG. 6, as the alternator shaft 40 is axially moved in the rotary body 31 of the alternator pulley 20, the rotor 6 may be allowed to move in the housing 8 of the alternator 5. According to various aspects of the present invention, as the length of the stator 7 is longer than the length of the rotor 6, an interaction between the rotor 6 and the stator 7 may be smoothly made even when the rotor 6 moves.

As illustrated in FIG. 6, the actuator 60 may be rotatably supported at an intermediate portion of the alternator shaft 40. Unlike this, the actuator 60 may be disposed on an external surface or in the internal of the alternator 5.

Because the remaining configurations and operations thereof are the same as or similar to those of the preceding embodiments, a detailed description thereof will be omitted.

Figure 7:
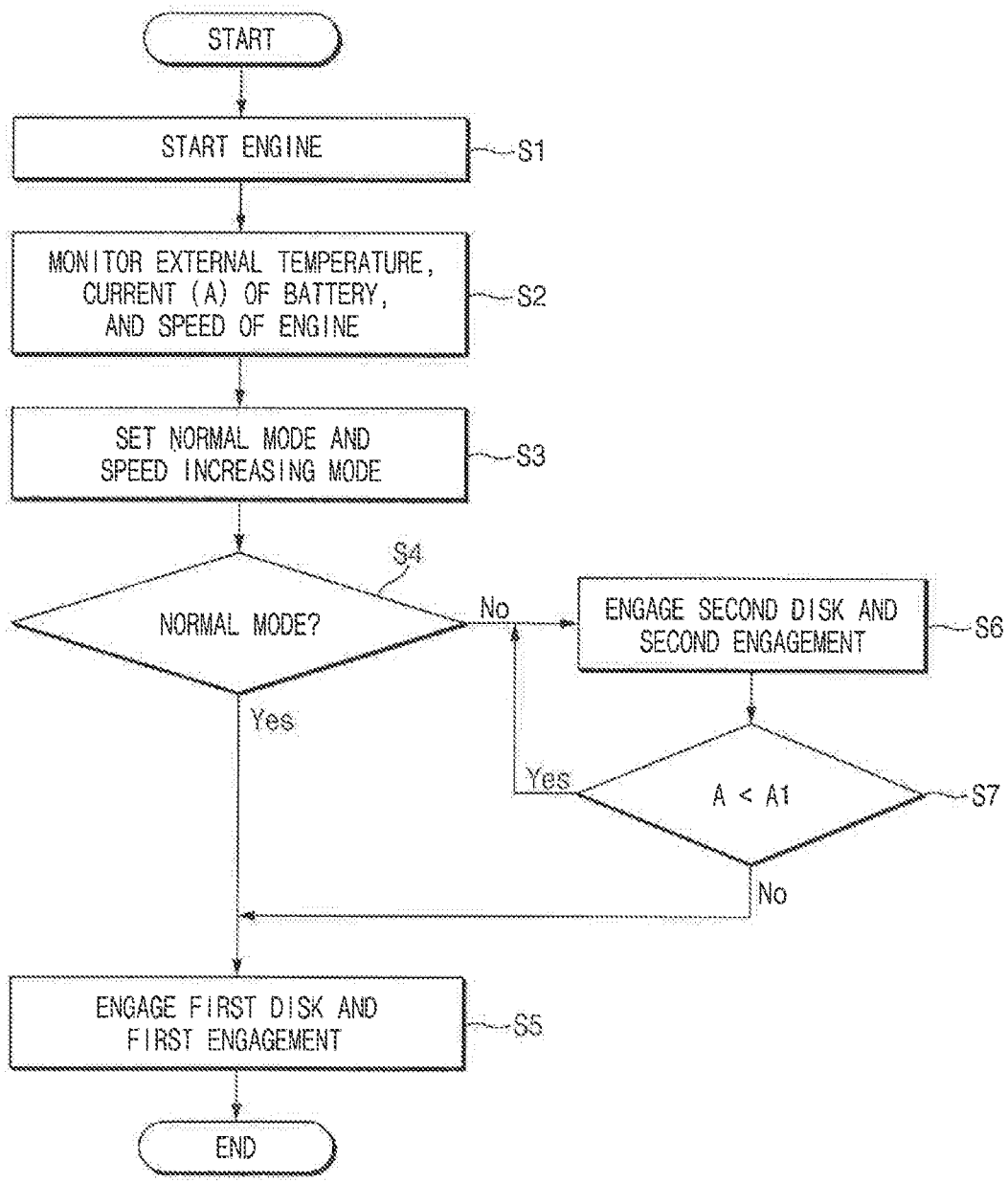
FIG. 7 is a flowchart illustrating a method for controlling an alternator driving apparatus according to an exemplary embodiment of the present invention.
Figure 8:
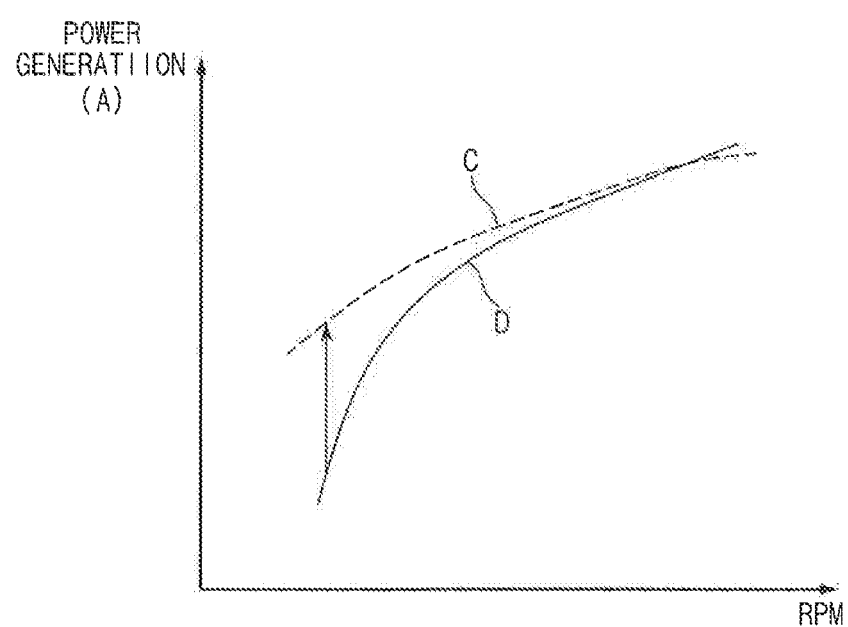
FIG. 8 is a graph depicting a result obtained by comparing electric power generations depending on the speeds of engines according to an exemplary embodiment of the present invention and according to the related art.

FIG. 7 is a flowchart illustrating a method for controlling an alternator driving apparatus 10 according to an exemplary embodiment of the present invention.

When the engine starts (S1), the external temperature of the vehicle, the current A of the battery, and the speed of the engine are monitored (S2). Here, the external temperature of the vehicle may be detected by a temperature detector, the current A of the battery may be detected by a current detector, and the speed of the engine may be detected by an RPM sensor.

Next, the control device sets a normal mode and a speed increasing mode (S3).

The normal mode is a mode which is conducted when any one of a condition in which the external temperature is a predetermined temperature or higher, a condition in which the current A of the battery is not less than a predetermined current A1, and a condition in which the rotation speed of the engine 1 is a high speed or a middle speed is satisfied, and is a mode in which the rotation speeds of the alternator shafts 40, 41, and 42 are the same as the rotation speed of the alternator pulley 20 through engagement of the first gear portion 71 and the first engagement 51.

The speed increasing mode is a mode which is conducted when any one of a condition in which the external temperature is a predetermined temperature or lower, a condition in which the current A of the battery is not more than a predetermined current A1, and a condition in which the rotation speed of the engine 1 is a low speed is satisfied, and is a mode in which the rotation speeds of the alternator shafts 40, 41, and 42 are higher than the rotation speed of the alternator pulley 20 through the speed increasing ratio R determined through engagement of the second gear portion 72 and the second engagement 52.

Because the battery may be easily discharged when the external temperature is not more than a predetermined temperature, the speed increasing mode in which the rotation speeds of the alternator shafts 40, 41, and 42 are higher than the rotation speed of the alternator pulley 20. Because the battery may not be easily discharged when the external temperature is not less than a predetermined temperature, the normal mode in which the rotation speeds of the alternator shafts 40, 41, and 42 are the same as the rotation speed of the alternator pulley 20 may be determined. Here, the predetermined temperature may be changed more variously according to an external environment or a specification of the battery. For example, the predetermined temperature may be 0° C.

Because charging of the battery is significantly required when the current A of the battery is not more than the predetermined current A1, the speed increasing mode in which the rotation speeds of the alternator shafts 40, 41, and 42 are higher than the rotation speed of the alternator pulley 20 may be determined. Because charging of the battery is not significantly required when the current A of the battery is not less than the predetermined current A1, the normal mode in which the rotation speeds of the alternator shafts 40, 41, and 42 are the same as the rotation speed of the alternator pulley 20 may be determined.

Because charging of the battery is significantly required when the rotation speed of the engine corresponds to a low speed section or the engine corresponds to an idling condition, the speed increasing mode in which the rotation speeds of the alternator shafts 40, 41, and 42 are higher than the rotation speed of the alternator pulley 20 may be determined. Because charging of the battery is not significantly required when the rotation speed of the engine corresponds to a high or middle speed condition, the normal mode in which the rotation speeds of the alternator shafts 40, 41, and 42 are the same as the rotation speed of the alternator pulley 20 may be determined.

The control device determines whether the mode is a normal mode or a speed increasing mode (S4).

According to various aspects of the present invention, in the normal mode corresponding to any one of a condition in which the external temperature is a predetermined temperature or higher, a condition in which the current A of the battery is a predetermined current A1 or higher, or a high or middle speed condition of the engine 1, the control device controls the actuator 60 to engage the first gear portion 71 and the first engagement 51 (S5). Accordingly, the alternator shafts 40, 41, and 42 may be rotated at the same speed as the rotation speed of the alternator pulley 20.

According to various aspects of the present invention, in the speed increasing mode corresponding to any one of a condition in which the external temperature is a predetermined temperature or lower, a condition in which the current A of the battery is a predetermined current A1 or lower, or a lower speed or idling condition of the engine 1, the control device controls the actuator 60 to engage the second gear portion 72 and the second engagement 52 (S6). Accordingly, the alternator shafts 40, 41, and 42 may be rotated at a rotation speed which is higher than the rotation speed of the alternator pulley 20 through the speed increasing ratio determined by the engagement of the second gear portion 72 and the second engagement 52.

After the speed increasing mode, it is determined whether the current A of the battery is lower than the predetermined current A1 (S7), the process returns to S6 when the current A of the battery is lower than the present current A, and the process returns to S5 when the current A of the battery is the present current A1 or higher.

According to an exemplary embodiment of the present invention, the speed of the alternator shaft may be changed even in a low speed section or an idling condition of the engine so that the power generation of the alternator may be continued, and through this, as illustrated in FIG. 6, the present invention (line C) may remarkably increase the power generation of the alternator in a low speed section as compared with the related art (line D).

According to an exemplary embodiment of the present invention, because the speed of the alternator is changed according to a change of the speed of the engine, a charging state of the battery, and the like, the output current and the power generation efficiency of the alternator may be stably maintained. For example, in a low speed section or an idling condition, the power generation may be remarkably enhanced by increasing the rotation speed of the alternator pulley.

According to an exemplary embodiment of the present invention, the power generation of the alternator may be continued and the power generation of the alternator may be enhanced by increasing the speed of the alternator pulley at a high speed increasing ratio in at least one of a condition in which the external temperature is a predetermined temperature or lower, a condition in which the current of the battery is a predetermined current or lower, and a low speed section or an idling condition of the engine, and accordingly, the power generation efficiency of the alternator may be remarkably improved.

The above description is a simple exemplification of the technical spirit of the present invention, and the present invention may be variously corrected and modified by those skilled in the art to which the present invention pertains without departing from the essential features of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an alternator driving apparatus, wherein the alternator driving apparatus comprises a crank pulley mounted on a crank shaft of an engine, an alternator pulley connected to the crank pulley through a driving belt, an alternator shaft connected between the alternator and the alternator pulley, and a rotation speed varying mechanism configured to vary a rotation speed of the alternator shaft, the method comprising:
monitoring an external temperature, a current of a battery, a speed of the engine;
in any one of a condition in which an external temperature is not less than a predetermined temperature, a condition in which the current of the battery is not less than a predetermined current, and a condition in which the rotation speed of the engine is a high or middle speed which is higher than a predetermined speed, the alternator shaft is rotated at a same rotation speed as a rotation speed of the alternator pulley.

2. The method of claim 1, wherein in any one of a condition in which an external temperature is not more than a predetermined temperature, a condition in which the current of the battery is not more than the predetermined current, and a condition in which the rotation speed of the engine is a speed lower than the predetermined speed, the alternator shaft is rotated at a rotation speed which is higher than the rotation speed of the alternator pulley.

* * * * *